United States Patent [19]
Shinada

[11] Patent Number: 5,734,563
[45] Date of Patent: Mar. 31, 1998

[54] SYNCHRONOUS RECTIFICATION TYPE CONVERTER

[75] Inventor: Yousuke Shinada, Tokyo, Japan

[73] Assignee: NEC Corporation, Japan

[21] Appl. No.: 655,990

[22] Filed: May 31, 1996

[30] Foreign Application Priority Data

Jun. 1, 1995 [JP] Japan .................... 7-135081

[51] Int. Cl.$^6$ .................... H02M 3/335; H02M 7/217
[52] U.S. Cl. .................... 363/21; 363/127
[58] Field of Search .................... 363/21, 127

[56] References Cited

U.S. PATENT DOCUMENTS

| | | | |
|---|---|---|---|
| 5,303,138 | 4/1994 | Rozman | 363/21 |
| 5,528,482 | 6/1996 | Rozman | 363/21 |
| 5,590,032 | 12/1996 | Bowman et al. | 363/127 |

Primary Examiner—Stuart N. Hecker
Attorney, Agent, or Firm—Ostrolenk, Faber, Gerb & Soffen, LLP

[57] ABSTRACT

A synchronous rectification type converter includes a main transformer having a primary winding to which an unrectified input voltage is applied and a main switch connected in series with the primary winding of the main transformer. A series-coupled capacitor and clamp switch are connected across the primary winding of the main transformer, where the clamp switch is biased substantially opposite to the main switch such that the reset voltage at the primary winding of the main transformer is clamped. First and second series-coupled synchronous rectifiers which are operated in synchronism with the operation of the main switch are connected across a secondary winding of the main transformer. A first impedance circuit is arranged between a first auxiliary winding of the main transformer and a control terminal of the first synchronous rectifier and a second impedance circuit is arranged between a second auxiliary winding of the main transformer and a control terminal of the second synchronous rectifier such that synchronous rectification is achieved in accordance with an active clamp scheme.

18 Claims, 9 Drawing Sheets

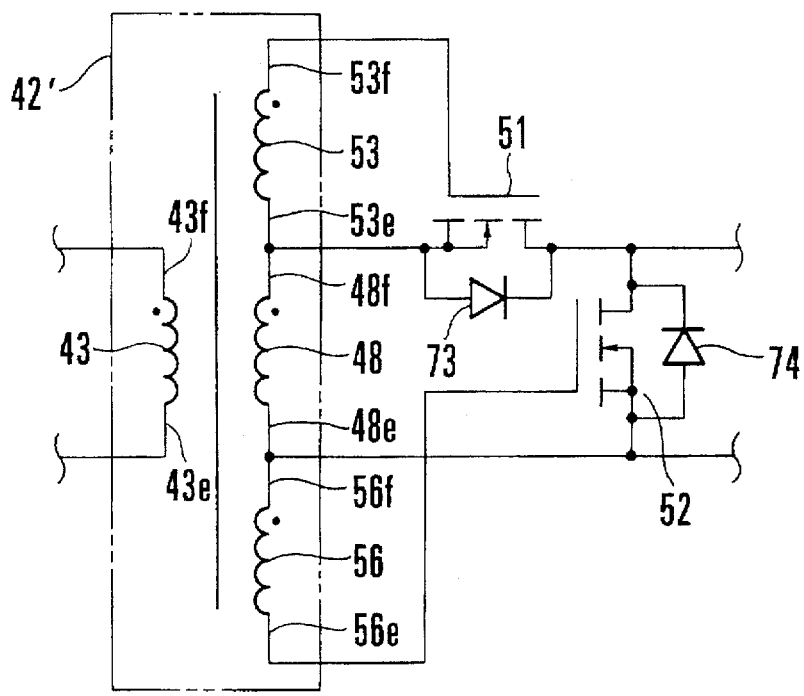
F I G. 6
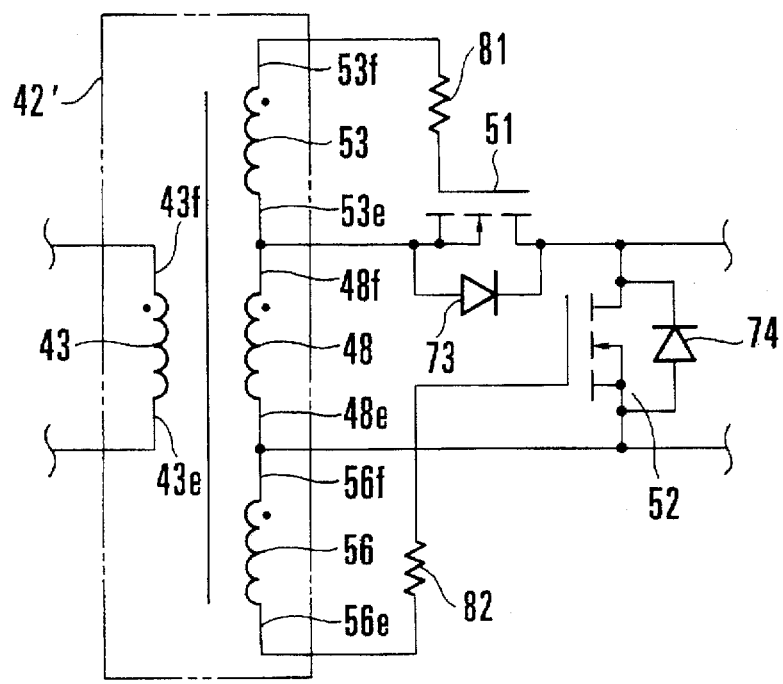
F I G. 7

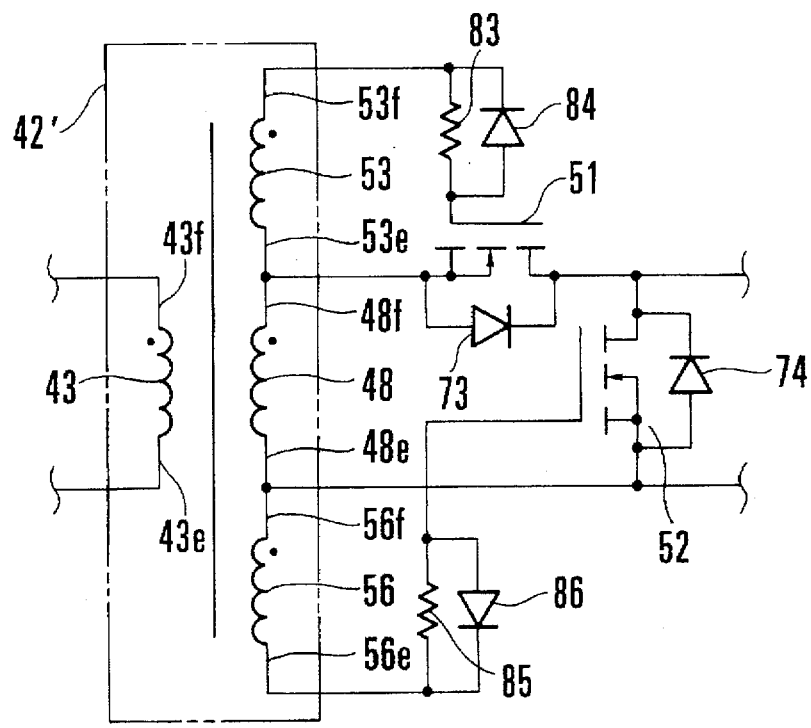
F I G. 8
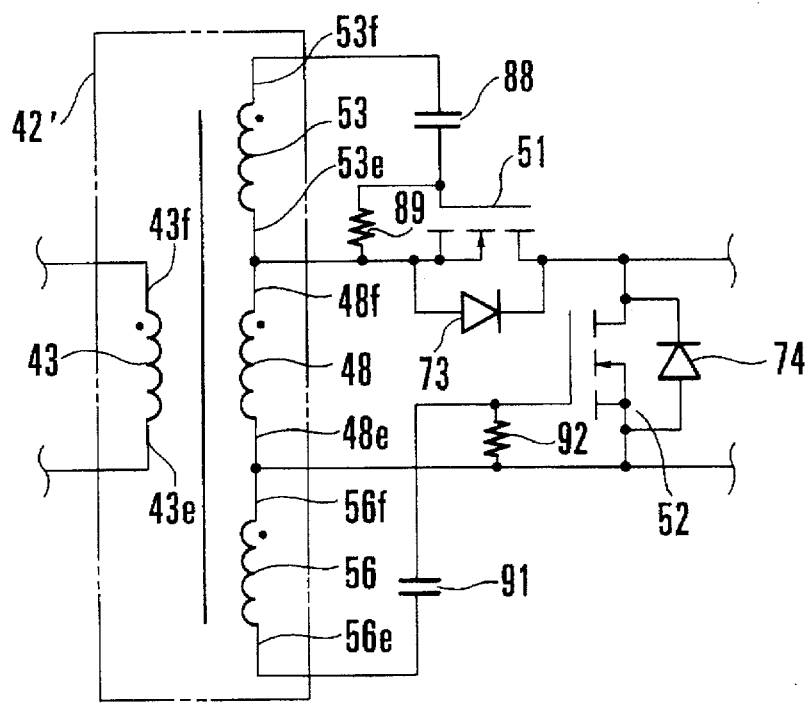
F I G. 9

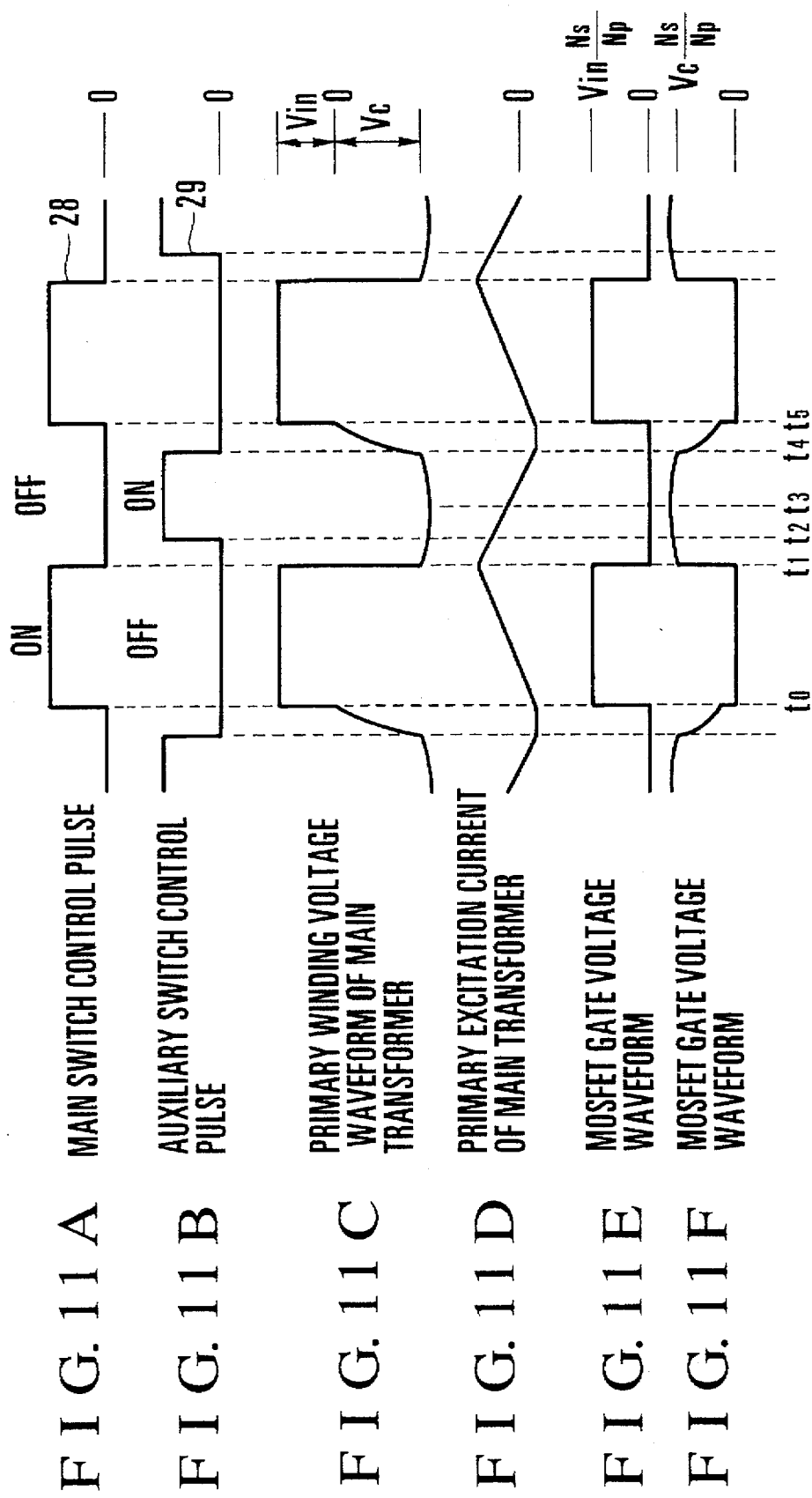

SYNCHRONOUS RECTIFICATION TYPE CONVERTER

BACKGROUND OF THE INVENTION

The present invention relates to a synchronous rectification type converter used in the field of, e.g., switching regulators which require relatively high efficiency of power supplies.

A diode is generally used as a rectifier element in a rectifier circuit. Such a rectifier circuit is limited in how low the forward voltage drop of the diode may be decreased and, therefore, how low the voltage, conduction losses may be reduced. Consequently, the largest loss in a switching power supply is employing diode rectifiers in the rectifier circuit. This loss poses a serious problem. To solve this problem, a switching power supply using a MOSFET (Metal Oxide Semiconductor Field Effect Transistor) for a rectifier element has been developed, thereby reducing the loss of the rectifier circuit.

Surge voltages at switching in converters converter using a semiconductor element as a switch or a rectifier element poses a serious problem. Conventional converters employ RC snubbers to reduce this surge voltage. Alternatively an active clamp scheme may be used in a converter such that the reset voltage on the primary winding side of the main transformer is clamped which allows suppression of the surge voltage without any loss. Clamping of the reset voltage allows use of a semiconductor element having a low breakdown voltage —; i.e., a product having a low conduction loss—(as a rectifier).

The drive waveform for the gate of a MOSFET used in a rectifier circuit is preferably rectangular. When the gate of the MOSFET employed as the rectifier element is driven by a voltage of the secondary winding of the main transformer and the waveform of this voltage is not rectangular, the active clamp scheme can be employed to convert this voltage waveform into a rectangular wave. Therefore, when the active clamp scheme is employed in a synchronous rectification type circuit, the synchronous rectification effect can be further enhanced.

FIG. 10 shows a conventional synchronous rectification type converter using an active clamp scheme. A start point 13f of a primary winding 13 of a main transformer 12 is connected to the high-potential side of an input power supply 11 of the synchronous rectification type converter. An end point 13e of the primary winding 13 is connected to the drain of a main switch 14 implemented using a MOSFET. The source of the main switch 14 is connected to the low-potential side of the input power supply 11. The synchronous rectification type converter also includes an auxiliary switch 16 implemented using a MOSFET. The source of the auxiliary switch 16 is connected to the end point 13e of the primary winding 13, and the drain of the auxiliary switch 16 is connected to one terminal of a capacitor 17. The other terminal of the capacitor 17 is connected to the start point 13f of the primary winding 13.

A start point 18f of a secondary winding 18 of the main transformer 12 is connected to the drain of a MOSFET 21, and an end point 18e of the secondary winding 18 is connected to the drain of a MOSFET 22. The sources of the two MOSFETs 21 and 22 are connected together. The start point 18f of the secondary winding 18 is connected to the gate of the MOSFET 22. The end point 18e of the secondary winding 18 is connected to the gate of the MOSFET 22. One terminal of a choke coil 23 is connected to the drain of the MOSFET 21 and the other terminal of the choke coil 23 is connected one terminal of a capacitor 24. The other terminal of the capacitor 24 is connected to the source of the MOSFET 21.

A load resistor 25 is connected across the capacitor 24. The converter output of the synchronous rectification type at the connection point between the choke coil 23 and the capacitor 24 is input to a control circuit 27. In this specification, a basic circuit comprising the main transformer 12, the main switch rectifier element 14 and an output LC filter (23 and 24) to because it converts an input to an output is called a converter.

The control circuit 27 outputs a main switch control pulse 28 and an auxiliary switch control pulse 29. Of these pulses, the main switch control pulse 28 is input to the gate of the main switch 14. The auxiliary switch control pulse 29 is input to the gate of the auxiliary switch 16. Note that diodes 31 to 34 are parasitic diodes of the auxiliary switch 16, the main switch 14, and the MOSFETs 21 and 22, respectively. A capacitor 36, connected in parallel with the diode 32, is the parasitic capacitance between the drain and source of the main switch 14.

The operation of the synchronous rectification type converter will be described below. Assume that the numbers of turns of the primary and secondary windings 13 and 18 of the main transformer 12 are defined as $N_p$ and $N_s$, respectively, and that the voltage across the capacitor 17 is defined as $V_c$.

FIGS. 11A to 11F show the operation waveforms of the respective components of the synchronous rectification type converter. FIG. 11A shows the in waveform of the main switch control pulse 28. The main switch 14 is turned on at time $t_0$ and turned off at time $t_1$. FIG. 11B shows the waveform of the auxiliary switch control pulse 29. The auxiliary switch 16 is turned on at time $t_2$. FIG. 11C shows the voltage waveform of the primary winding 13 of the main transformer 12 and FIG. 11D shows the primary excitation current of the main transformer 12. The reset voltage of the main transformer 12 is at its maximum at time $t_3$. As shown in FIG. 11B, the auxiliary switch 16 is turned off at time $t_4$. The main switch 14 is turned on again at time $t_5$. FIG. 11E shows the voltage waveform at the gate of the MOSFET 22 and FIG. 11F shows the voltage waveform of the MOSFET 21.

As shown in FIGS. 11A and 11B, the main switch control pulse 28 and the auxiliary switch control pulse 29 perform opposite operations and therefore exhibit substantially inverted waveforms from one another. These pulses 28 and 29 have the common "OFF" time intervals of $t_1$ to $t_2$ and $t_4$ to $t_5$. The main switch 14 is kept on during the time interval of $t_0$ to $t_1$. At this time, as shown in FIG. 11C, a positive voltage is applied to the start points 13e and 18e of the primary and secondary windings 13 and 18, and a voltage $V_{in} \cdot N_s/N_p$ appears at the secondary winding 18. The gate of the MOSFET 22 is forward-biased by the secondary winding voltage, as shown by the gate voltage waveform of the MOSFET 22 in FIG. 11C, thereby turning on the MOSFET 22.

The ON voltage drop of the MOSFET 22 is normally about 0.2 V and, therefore the gate of the MOSFET 21 is reverse-biased, as shown in FIG. 11F. The MOSFET 21 is thus off. A load current flows in order through the following components the start point 18f of the secondary winding 18, the choke coil 23, the load resistor 25, the source of the MOSFET 22, the drain of the MOSFET 22, and the end point 18e of the secondary winding 18.

During the time interval of $t_0$ to $t_1$, the auxiliary switch 16 is off. During this time, a voltage having a value $V_{cn}+V_c$ is applied to the drain-source path of the auxiliary switch 16.

During the time interval of $t_1$ to $t_2$, both the main switch 14 and the auxiliary switch 16 are off. The magnetic energy accumulated in the main transformer 12 during the time interval of $t_1$ to $t_2$ is absorbed by the capacitor 17. This is so because current flows in order through the following components: the end point 13e of the primary winding 13, the anode of the diode 31 of the auxiliary switch 16, the cathode of the diode 31, the capacitor 17, and the start point 13f of the primary winding 13. Subsequent to the time interval of $t_1$ to $t_2$, i.e., during the time interval of $t_2$ to $t_3$, the auxiliary switch 16 is kept on and, therefore, the magnetic energy accumulated in the main transformer 12 is absorbed by the capacitor 17. During this period, current flows, in order, through the following components: the end point 13e of the primary winding 13, the source of the auxiliary switch 16, the drain of the auxiliary switch 16, the capacitor 17, and the start point 13f of the primary winding 13. Therefore, the auxiliary switch 16 may be turned on during the time interval of $t_1$ to $t_3$.

During the time interval of $t_3$ to $t_4$, the energy accumulated by the capacitor 17 during the time interval of $t_1$ to $t_3$ is absorbed again by the main transformer 12. During this period, current flows, in order, through the following components: the capacitor 17, the drain of the auxiliary switch 16, the source of the auxiliary switch 16, the end point 13e of the primary winding 13, the start point 13f of the primary winding 13, and the capacitor 17.

At time $t_4$, the auxiliary switch 16 is turned off. During the subsequent time interval of $t_4$ to $t_5$, the energy accumulated by the parasitic capacitance 36 in the drain-source path of the main switch 14 is absorbed by the main transformer 12. Current flows, in order, through the following components: the parasitic capacitance 36, the end point 13e of the primary winding 13, the start point 13f of the primary winding 13, the high-potential side of the input power supply 11, the low-potential side of the input power supply, and the parasitic capacitance 36.

When the capacitance of the capacitor 17 is selected such that the time constant of the primary inductance of the main transformer 12 and the capacitor 17 is set much larger than the switching period of the converter, the reset voltage of the main transformer 12 becomes a linearly approximated resonant waveform clamped by the capacitor during the period of $t_1$ to $t_4$. During the period of $t_4$ to $t_5$, the reset voltage has a resonant waveform which abruptly falls due to the primary inductance of the main transformer 12 and the parasitic capacitance 36. As a result, the reset voltage of the main transformer 12 has an almost rectangular waveform.

During the time interval of $t_1$ to $t_5$, a positive voltage is applied to the end points 13e and 18e of the primary and secondary windings 13 and 18 of the main transformer 12 and a voltage having a value $V_c \cdot N_s/N_p$ is generated by the secondary winding 18. The gate of the MOSFET 21 is forward-biased by this winding voltage is turned on. The voltage and, therefore MOSFET 21 drop of the MOSFET 21 is normally about 0.2 V and, therefore, the gate of MOSFET 22 is reserve-biased and MOSFET 22 is off. The choke coil 23 discharges the energy accumulated during the time interval of $t_0$ to $t_1$ to the load resistor 25 during the time interval of $t_1$ to $t_5$. During this period, the load current flows, in order, through the following components the choke coil 23, the load resistor 25, the source of the MOSFET 21, the drain of the MOSFET 21, and the choke coil 23.

The gates of the two MOSFETs 21 and 22 are both driven by the secondary winding 18 of the main transformer 12. Thus, the operation of the MOSFETs 21 and 22 are in synchronization with the operation of the main switch 14, thereby constituting a synchronous rectifier circuit.

In the conventional synchronous rectification type converter, as has been described above, the reset voltage of the main transformer 12 has an almost rectangular waveform during the time interval of $t_1$ to $t_5$ i.e., when the main switch 14 is off. For this reason, the voltage needed for keeping the MOSFET 21 on can be continuously applied to the gate terminal of the MOSFET 21, thereby minimizing the loss of the synchronous rectification type converter. Even if the input and load conditions of the converter change, the reset voltage of the main transformer does not vary significantly. Therefore, the MOSFET 21 can be stably driven against the variations in input and load of the converter.

The peak value of the reset voltage of the main transformer 12 can be reduced. Parts having a low breakdown voltage, i.e., parts having a low ON resistance and a small parasitic capacitance, can be used for the main transformer 12 and the MOSFET 22, thereby advantageously minimizing the loss.

In the conventional synchronous rectification type converter using the active clamp scheme, the control terminals (i.e., the gates of the MOSFETs 21 and 22 in FIG. 10) of the synchronous rectifier are driven by the secondary winding 18 of the main transformer 12. The secondary winding voltage is determined by the design of the main circuit of the converter. For this reason, an optimal drive voltage may not be applied to the control terminals of the synchronous rectifier, thereby increasing the loss of the rectifier circuit.

For example, when a low input voltage is applied to the converter, a low output voltage is produced, the voltage at the secondary winding 18 of the main transformer 12 is reduced, the synchronous rectifier cannot be satisfactorily turned on, and the conduction loss may be increased. When a high input voltage is applied to the converter, a high output voltage is produced, the voltage at the secondary voltage 18 of the main transformer 12 is excessively increased, and the drive loss of the synchronous rectifier is undesirably increased.

SUMMARY OF THE INVENTION

It is an object of the present invention to provide a synchronous rectifier circuit capable of efficiently utilizing a power supply.

In order to achieve the above object of the present invention, there is provided a synchronous rectification type converter, comprising a main transformer having a primary winding to which an unrectified input voltage is applied, a main switch connected in series with the primary winding of the main transformer, a series circuit connected in parallel with the primary winding of a main transformer and consisting of a capacitor and a clamp switch operated opposite to an operation of the main switch to clamp a reset voltage at the primary winding of the main transformer, a series circuit connected in parallel with a secondary winding of the main transformer and consisting of first and second synchronous rectifiers operated in synchronism with the operation of the main switch, a first impedance circuit arranged between a first auxiliary winding of the main transformer and a control terminal of the first synchronous rectifier, and a second impedance circuit arranged between a second auxiliary winding of the main transformer and a control terminal of the second synchronous rectifier, wherein synchronous rectification is performed in accordance with an active clamp scheme.

BRIEF DESCRIPTION OF THE DRAWINGS

FIG. 6 is a circuit diagram showing a zero impedance circuit and its peripheral circuits used in the synchronous rectification type converter of the present invention;

FIG. 7 is a circuit diagram showing a resistance impedance circuit and its peripheral circuits used in the synchronous rectification type converter of the present invention;

FIG. 8 is a circuit diagram showing an impedance circuit as a combination of a resistor and a diode and its peripheral circuits used in the synchronous rectification type converter of the present invention;

FIG. 9 a circuit diagram showing a capacitor impedance circuit and its peripheral circuits used in the synchronous rectification type converter of the present invention;

FIGS. 11A to 11F are timing charts showing the waveforms of the respective components of the conventional synchronous rectification type converter shown in FIG. 10.

DESCRIPTION OF THE PREFERRED EMBODIMENT

The present invention will be described in detail with reference to the preferred embodiment.

Figure 1:
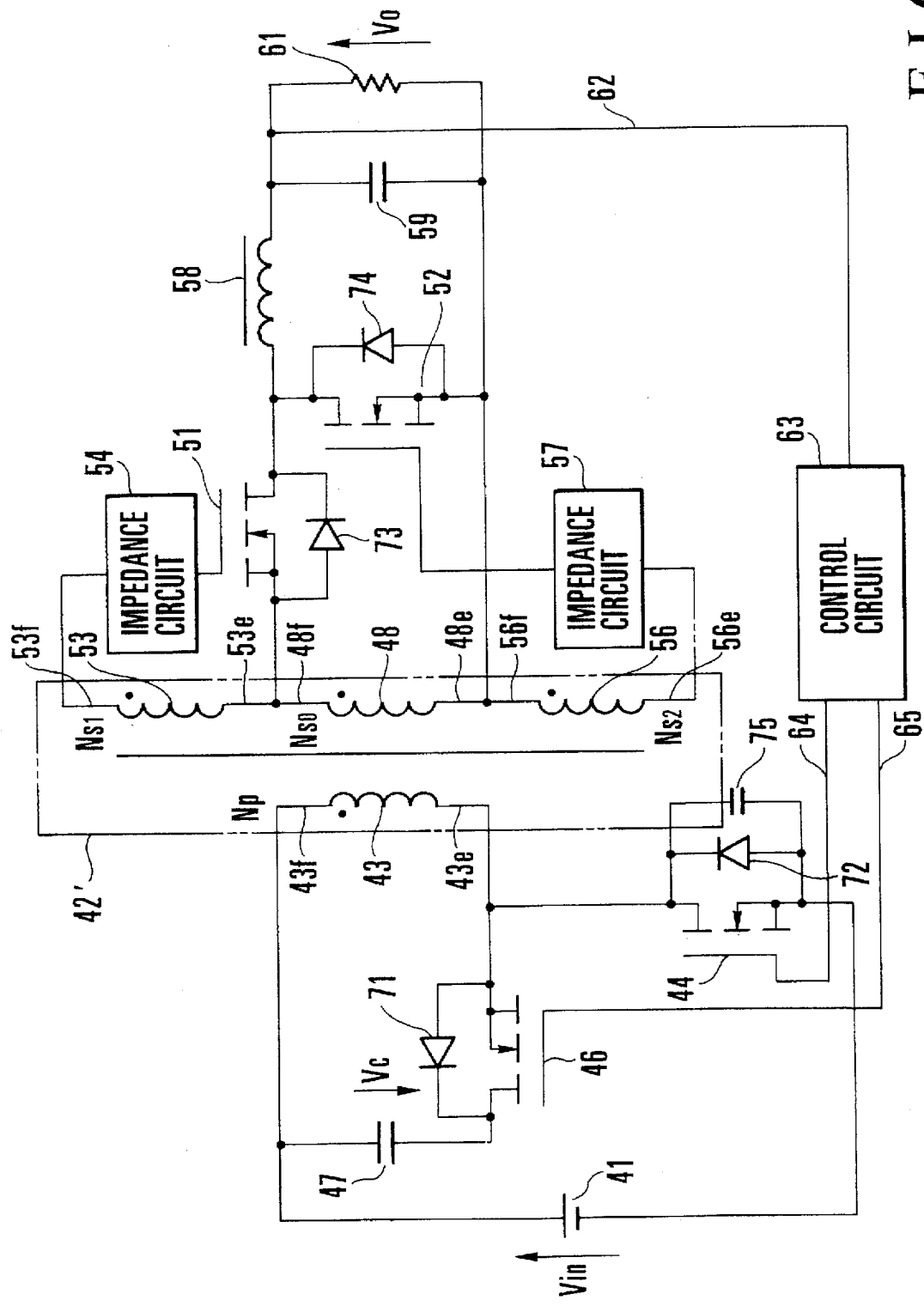
FIG. 1 is a circuit diagram showing the arrangement of a synchronous rectification type converter according to an embodiment of the present invention.

FIG. 1 shows the arrangement of a synchronous rectification type converter according to an embodiment of the present invention. In this synchronous rectification type converter, a start point 43f of a primary winding 43 of a main transformer 42 is connected to the high-potential side of an input power supply 41. An end point 43e of the primary winding 43 is connected to the drain of a main switch 44. The source of the main switch 44 is connected to the low-potential side of the input power supply 41. The synchronous rectification type converter also includes an auxiliary switch 46. The source of the auxiliary switch 46 is connected to the end point 43e of the primary winding 43, and the drain of the auxiliary switch 46 is connected to one terminal of a capacitor 47. The other terminal of the capacitor 47 is connected to the start point 43f of the primary winding 43.

A start point 48f of a secondary winding 48 of the main transformer 42 is connected to the source of a MOSFET (Metal Oxide Semiconductor Field Effect Transistor) 51. An end point 48e of the secondary winding 48 is connected to the source of a MOSFET 52. The drains of the two MOSFETs 51 and 52 are connected together. A start point 53f of an auxiliary winding 53 of the main transformer 42 is connected to the gate of the MOSFET 51 through a first impedance circuit 54. An end point 53e of the auxiliary winding 53 is connected to the source of the MOSFET 51. A start end 56f of an auxiliary winding 56 of the main transformer 42 is connected to the source of the MOSFET 52. An end point 56e of the auxiliary winding 56 is connected to the gate of the MOSFET 52 through a second impedance circuit 57. One terminal of a choke coil 58 is connected to the drain of the MOSFET 52, and the other terminal thereof is connected to one terminal of a capacitor 59. The other terminal of the capacitor 59 is connected to the source of the MOSFET 52.

A load resistor 61 is connected across the capacitor 59. A converter output 62 from one terminal of the capacitor 59 is input to a control circuit 63. The control circuit 63 outputs a main switch control pulse 64 for controlling the main switch 44 and an auxiliary switch control pulse 65 for controlling the auxiliary switch 46. The main switch control pulse 64 is input to the gate of the main switch 44, and the auxiliary switch control pulse 65 is input to the gate of the auxiliary switch 46.

Note that diodes 71 to 74 are parasitic diodes of the auxiliary switch 46, the main switch 44, and the MOSFETs 51 and 52, respectively. A capacitor 75, connected in parallel with the diode 72, is a parasitic capacitance in the drain-source path of the main switch 44. In this embodiment, assume that the numbers of turns of the primary winding 42, the secondary winding 48, and the two auxiliary windings 53 and 56 of the main transformer 42 are defined as $N_p$, $N_{s0}$, $N_{s1}$, and $N_{s2}$, respectively.

Figure 2:
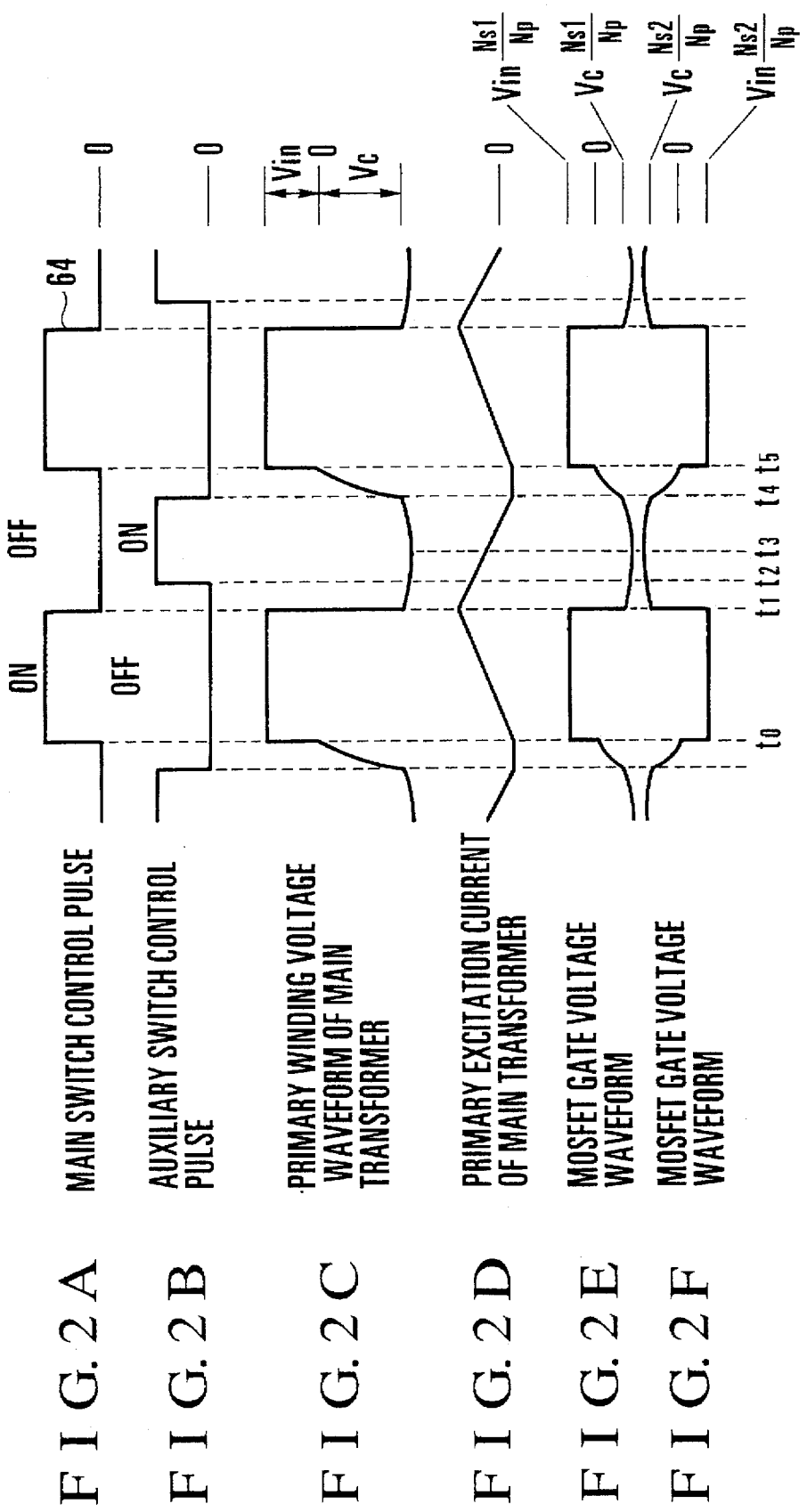
FIGS. 2A to 2F are timing charts showing the waveforms of the respective components of the synchronous rectification type converter shown in FIG. 1.

FIGS. 2A to 2F show the operation waveforms of the respective components of the synchronous rectification type converter. The operation of the synchronous rectification type converter of this embodiment will be described with reference to FIGS. 2A to 2F. FIG. 2A shows the waveform of the main switch control pulse 64. The main switch 44 is turned on at time $t_1$ and turned off at time $t_1$. FIG. 2B shows the waveform of the auxiliary switch control pulse 65. The auxiliary switch 46 is turned on at time $t_2$. FIG. 2C shows the voltage waveform of the primary winding 43 of the main transformer 42, and FIG. 2D shows a primary excitation current of the main transformer 42. The reset voltage of the main transformer 42 is at its maximum at time $t_3$. As shown in FIG. 2B, the auxiliary switch 46 is turned off at time $t_4$. The main switch 44 is turned on again at time $t_5$. FIG. 2E shows the voltage waveform at the gate of the MOSFET 51 and FIG. 2F shows the voltage waveform of the MOSFET 52.

As shown in FIGS. 2A and 2B, the main switch control pulse 64 and the auxiliary switch control pulse 65 perform opposite operations and therefore exhibit substantially inverted waveforms from one another. These pulses 64 and 65 have the common "OFF" time intervals of $t_1$ to $t_2$ and $t_4$ to $t_5$. The main switch 44 is kept on during the time interval of $t_0$ to $t_1$. At this time, as shown in FIG. 2C, a positive voltage is applied to the start points 43e, 48e, 53e, and 56e of the primary winding 43, the secondary winding 48, and the auxiliary windings 53 and 56, and a voltage $V_{in} \cdot N_{s1}/N_p$ appears at the auxiliary winding 53. The gate of the MOSFET 51 is forward-biased and turned on by the voltage on auxiliary winding 53.

The auxiliary winding 56 of the main transformer 42 generates a voltage $V_{in} \cdot N_{s2}/N_p$ which reverse-biases the gate of the MOSFET 52 and turns it off. A load current, flowing through the load resistor 61, flows, in order, through the following components the start point 48f of the secondary winding 48 of the main transformer 42, the source of the MOSFET 51, the drain of the MOSFET 51, the choke coil 58, the load resistor 61, and the end point 48e of the secondary winding 48. During the time interval of $t_0$ to $t_1$, as shown in FIG. 2B, the auxiliary switch 46 is off. During this interval, a voltage $V_{in}+V_c$ is applied to the drain-source path of the auxiliary switch 46.

Figure 10:
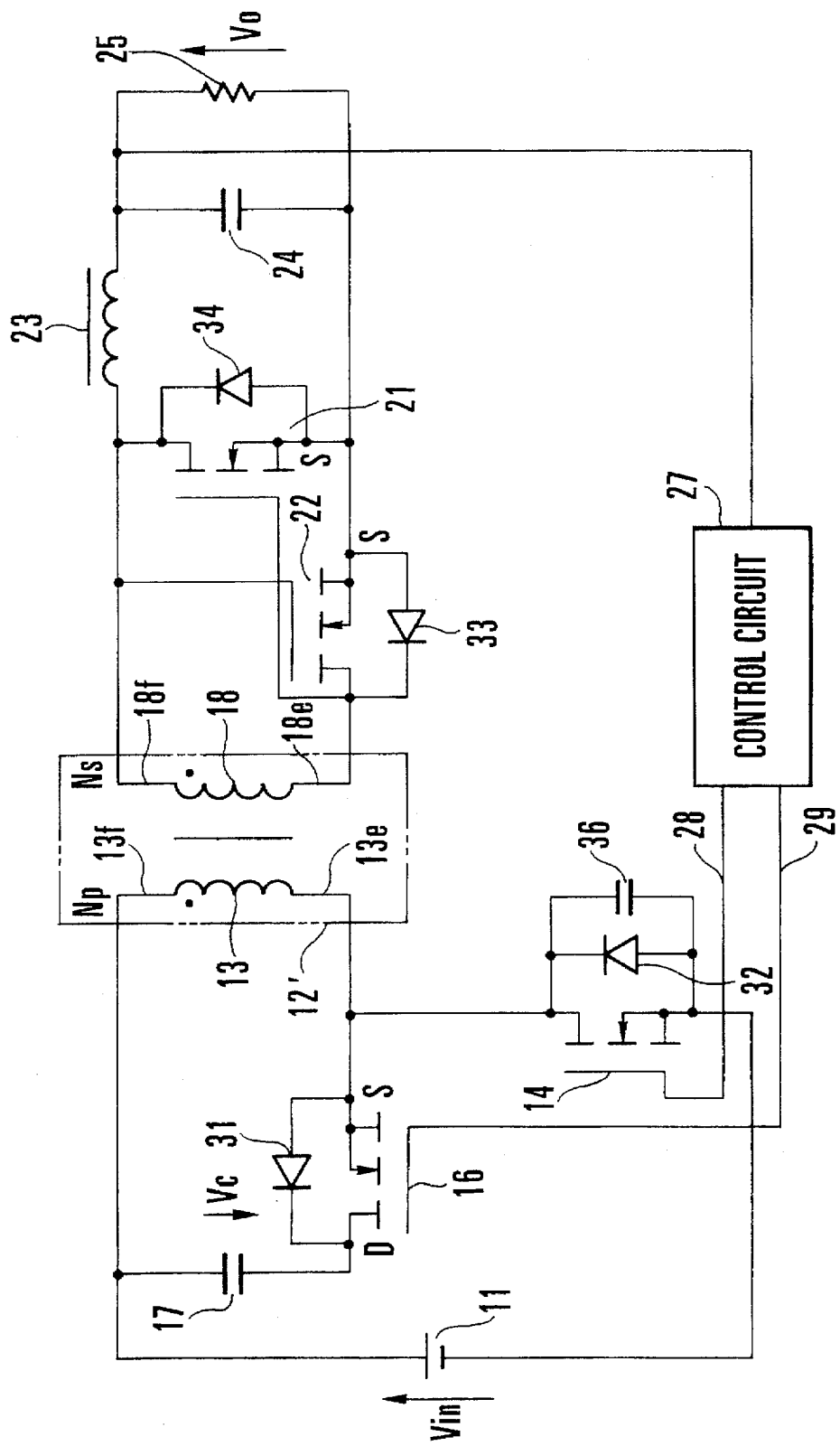
FIG. 10 is a circuit diagram showing a conventional synchronous rectification type converter of an active clamp scheme.

The operation of the primary side of the converter during the time interval of $t_1$ to $t_5$ is the same as that of the conventional synchronous rectification type converter shown in FIG. 10 and, therefore, a detailed description thereof will be omitted. A positive voltage is applied to the end points of the windings 43, 48, 53, and 56 of the main transformer 42 during the time interval of $t_1$ to $t_5$. During this period, the voltage $V_c \cdot N_{s1}/N_p$ appears at the auxiliary winding 53 of the main transformer 42. The gate of MOSFET 51 is reverse-biased by this winding voltage and the MOSFET 51 is turned off. The voltage $V_c \cdot N_{s2}/N_P$ appears at the auxiliary winding 56 of the main transformer 42 which forward biases the gate of MOSFET 52, turning it on by this winding.

The choke coil 58 discharges the energy accumulated during the time interval of $t_0$ to $t_1$ to the load resistor 61 during the time interval of $t_1$ to $t_5$. This load current flows, in order, through the following components: the choke coil 58, the load resistor 61, the source of the MOSFET 52, the drain of the MOSFET 52, and the choke coil 58.

As described above, the gates of the two MOSFETs 51 and 52 are both driven by the two auxiliary windings 53 and 56 of the main transformer 42. Thus, the operation of the MOSFETs 51 and 52 are in synchronization with the operation of the main switch 44, thereby constituting a synchronous rectifier circuit. Note that the drive voltages applied to the gates of the two MOSFETs 51 and 52 can be set to appropriate values by the numbers of turns $N_{s1}$ and $N_{s2}$ of the corresponding auxiliary windings 53 and 56.

First Modification

Figure 3:
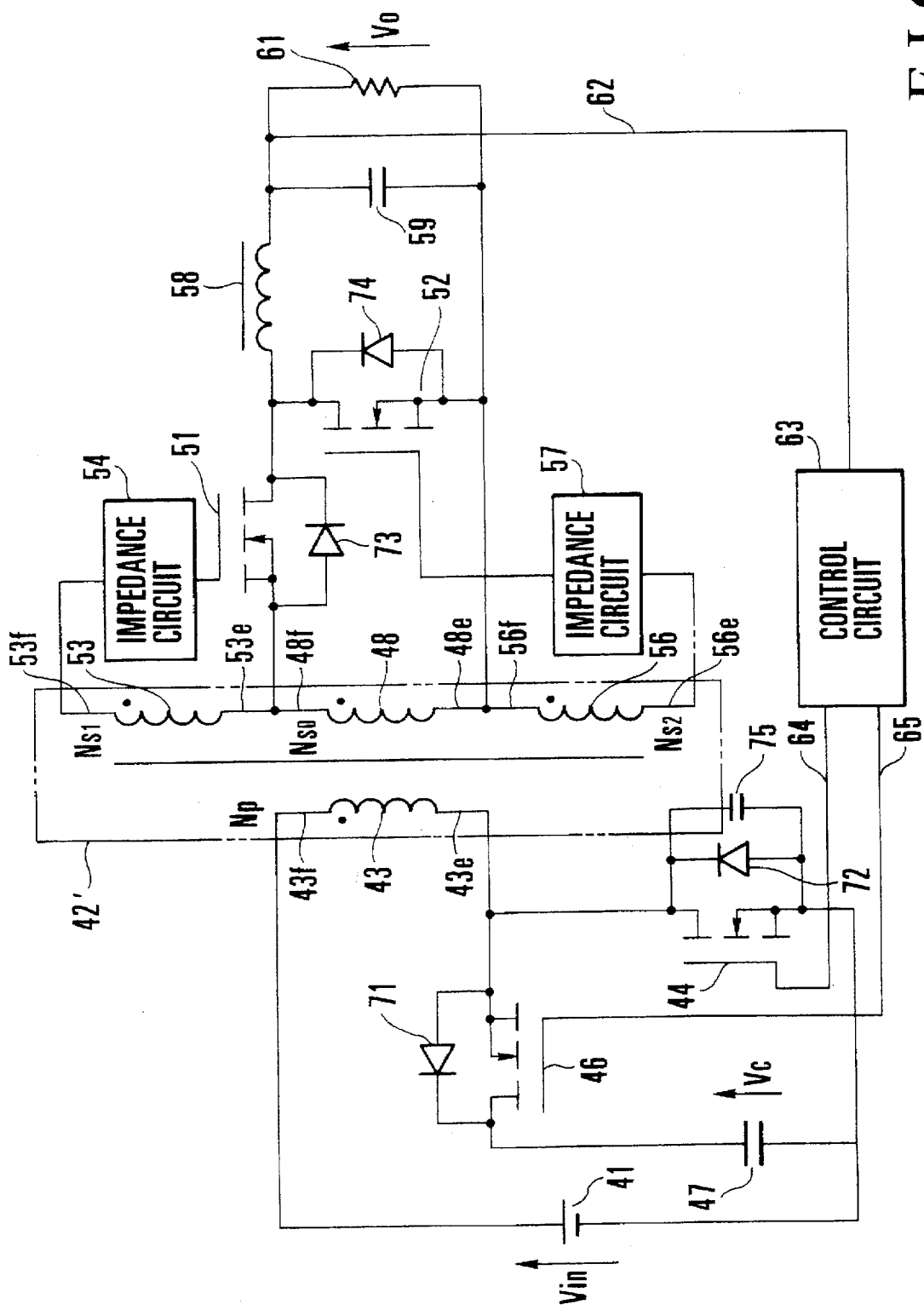
FIG. 3 is a circuit diagram showing a first modification of the synchronous rectification type converter of a present invention.

FIG. 3 shows the circuit arrangement of the first modification of the synchronous rectification type converter of the present invention. The same reference numerals as in FIG. 1 denote the same parts in FIG. 3 and a detailed description thereof will be omitted. In this modification, the position of the capacitor 47, which is connected to the drain of the auxiliary switch 46, is changed. More specifically, the capacitor 47 is connected between the source of the main switch 44 and the drain of the auxiliary switch 46.

The resonant current generated by the capacitor 47 and the primary inductance of the main transformer 42, therefore flows through the input power supply 41, which is different from the above embodiment. In other respects, the circuit operation of the synchronous rectifier circuit of FIG. 3 is the same as in the embodiment shown in FIG. 1.

Second Modification

Figure 4:
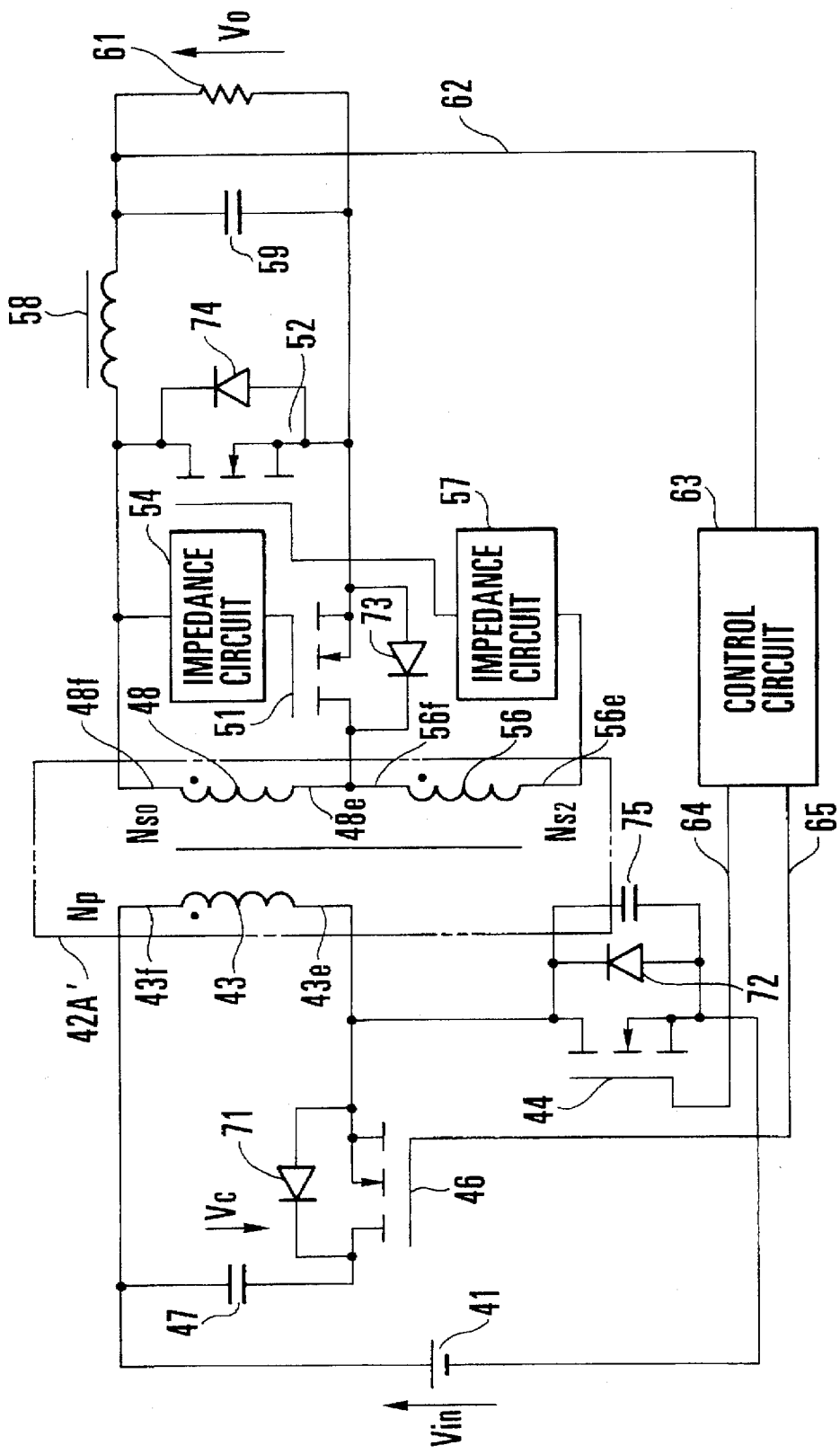
FIG. 4 is a circuit diagram showing the second modification of the synchronous rectification type converter of the present invention.

FIG. 4 shows the circuit arrangement of the second modification of the synchronous rectification type converter of the present invention. The same reference numerals as in FIG. 1 denote the same parts in FIG. 4 and a detailed description thereof will be omitted. In the second modification, the start point of the secondary winding 48 of a main transformer 42A' is connected to the gate of the MOSFET 51 through the first impedance circuit 54. In this second modification, the gate of the MOSFET 51 is forward biased by the voltage $V_{in} \cdot N_{s0}/N_p$ of the secondary winding 48 and reverse-biased by the voltage drop obtained upon turn-on of the MOSFET 52. In other respects the circuit arrangement of the synchronous rectifier circuit is the same as that in FIG. 1.

Third Modification

Figure 5:
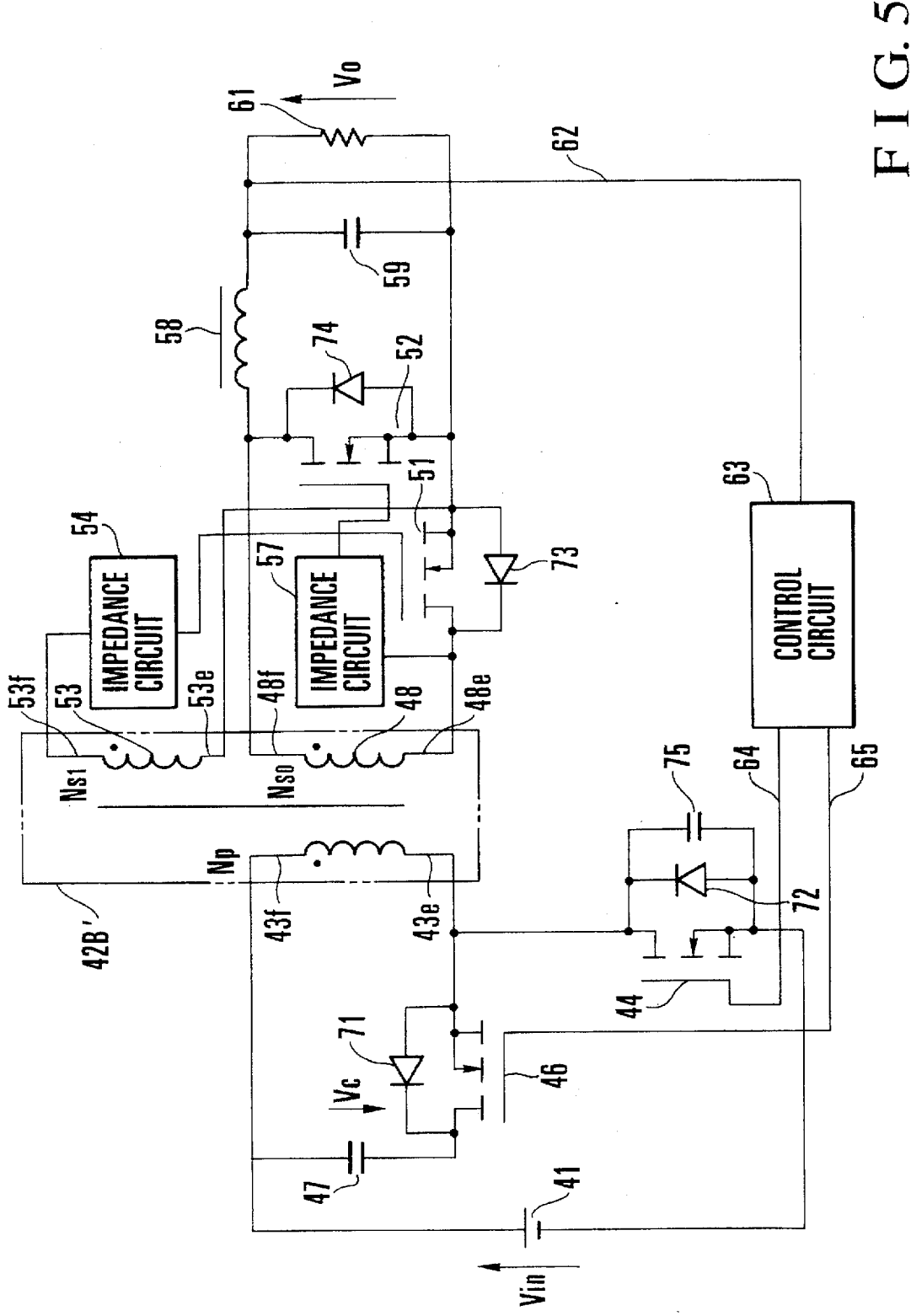
FIG. 5 is a circuit diagram showing a third modification of the synchronous rectification type converter of the present invention.

FIG. 5 shows the circuit arrangement of the third modification of the synchronous rectification type converter of the present invention. The same reference numerals as in FIG. 1 denote the same parts in FIG 5 and a detailed description thereof will be omitted. In the third modification, the second impedance circuit 57 is arranged between the end point 48e of the secondary winding 48 of a main transformer 42B' and the gate of the MOSFET 52. In addition, the start point 48f of the secondary winding 48 of the main transformer 42B is electrically isolated from the end point 53e of the auxiliary winding 53, and the start point 48f of the secondary winding 48 is connected to the drain of the MOSFET 52. The end 53e of the auxiliary winding 53 is connected to the source of the MOSFET 51.

In the third modification, the gate of the MOSFET 52 is forward-biased by the voltage $V_c \cdot N_{s0}/N_p$ of the secondary winding 48 through the second impedance circuit 57 and reverse-biased by the voltage drop obtained upon turn-on of the MOSFET 51. In other respects the circuit operation of the synchronous rectifier circuit is the same as that of the embodiment in FIG. 1.

In the second and third modifications shown in FIGS. 4 and 5, the number of auxiliary windings of the main transformer 42A' or 42B' is reduced by one.

FIGS. 6 to 9 show the detailed examples of the first and second impedance circuits 54 and 57 which may be used in the embodiments of the invention described above. FIG. 6 shows a zero impedance circuit and its peripheral circuits. As is apparent from a comparison with the arrangement of FIG. 1, the start point 53f of the auxiliary winding 53 is directly connected to the gate of the MOSFET 51. This arrangement is equivalent to having no first impedance circuit 54. The end point 56e of the auxiliary winding 56 is directly connected to the gate of the MOSFET 52. This arrangement is equivalent to having no second impedance circuit 57.

FIG. 7 shows a resistor impedance circuit and its peripheral circuits. A first resistor 81 is connected between the start point 53f of the auxiliary winding 53 and the gate of the MOSFET 51. A second resistor 82 is connected between the end point 56e of the auxiliary winding 56 and the gate of the MOSFET 52. The peak values of the gate currents of the two MOSFETs 51 and 52 are suppressed by the first and second resistors 81 and 82, thereby reducing ringing voltages generated across the MOSFETs 51 and 52, respectively.

FIG. 8 shows an impedance circuit as a combination of a resistor and a diode and its peripheral circuits. A parallel circuit including a first resistor 83 and a first diode 84 is connected between the start point 53f of the auxiliary winding 53 and the gate of the MOSFET 51. A parallel circuit a second resistor 85 and a second diode 86 is connected between the end point 56e of the auxiliary winding 56 and the gate of the MOSFET 52. The loss of the rectifier circuit may be increased by the turn-off delays of the two MOSFETs 51 and 52. To prevent such loss, the turn-off timing of the MOSFETs 51 and 52 are advanced by the first and second diodes 84 and 86, respectively.

FIG. 9 shows a capacitor impedance circuit and its peripheral circuits. A first capacitor 88 is arranged between the start point 53f of the auxiliary winding 53 and the gate of the MOSFET 51. A first resistor 89 is arranged between the gate and source of the MOSFET 51. A second capacitor 91 is arranged between the end point 56e of the auxiliary winding 56 and the gate of the MOSFET 52, and a second resistor 92 is arranged between the gate and source of the MOSFET 52. The first and second resistors 89 and 92 are used to prevent the gate potentials from being indefinite.

In this capacitor impedance circuit, assume that a voltage at the secondary winding 48 of the main transformer 42 is excessively high to drive the gates of the two MOSFETs 51 and 52. The first and second capacitors 88 and 91 are adjusted to obtain optimal drive voltages for input to the MOSFETs 51 and 52. In addition, since the input capacitances of the drive circuits for the MOSFETs 51 and 52 can be reduced, the drive loss of the rectifier circuit can be reduced.

As has been described above and in accordance with the present invention, the first and second auxiliary windings are disposed in the main transformer, which auxiliary windings are connected to the control terminals of the corresponding first and second synchronous rectifiers through impedance circuits, and the reset voltage of the main transformer has an almost rectangular wave. A voltage sufficiently high to turn on the synchronous rectifier is simultaneously stable and is applied to the control terminals of the synchronous rectifier in accordance with appropriate selection of the number of turns for the auxiliary windings. Therefore, in accordance with the invention the loss during rectification can be reduced.

According to one embodiment of the present invention, only one auxiliary winding is arranged in the main transformer, the first impedance circuit is connected between the auxiliary winding and the control terminal of the first synchronous rectifier, and the reset voltage sufficiently high of the main transformer has an almost rectangular wave. A voltage to turn on the synchronous rectifier is substantially constantly applied to the control terminal of the synchronous rectifier in accordance with the appropriate selection for the number of turns of the auxiliary winding. The number of auxiliary windings is reduced by one to simplify the structure of the main transformer and, at the same time, the loss during rectification can be reduced.

According to the present invention, since a MOSFET is used as the rectifier, the loss can be reduced as compared with the use of a Schottky diode.

According to the present invention, when a resistor impedance is used, the ringing voltage generated across each synchronous rectifier can be reduced. When the impedance circuit is implemented using a resistor and a diode, the turn-off timing of the synchronous rectifier can be advanced.

What is claimed is:

1. A synchronous rectification-type converter, comprising:
   a main transformer having a primary winding, a secondary winding and first and second auxiliary windings, said primary winding for connection to an unrectified input voltage;
   a main switch connected in series with said primary winding of said main transformer;
   a series-coupled capacitor and clamp switch circuit connected across said primary winding, wherein said clamp switch is biased substantially oppositely from said main switch such that a reset voltage on said primary winding of said main transformer is clamped;
   first and second series-coupled synchronous rectifiers each having a control terminal, said series-coupled rectifiers being connected across said secondary winding and being biased in synchronism with said main switch;
   a first impedance circuit coupled between said first auxiliary winding of said main transformer and said control terminal of said first synchronous rectifier; and
   a second impedance circuit coupled between said second auxiliary winding of said main transformer and said control terminal of said second synchronous rectifier,
   wherein synchronous rectification is performed in accordance with an active clamp scheme.

2. A converter according to claim 1, wherein said synchronous rectifier comprises a metal oxide semiconductor field effect transistor, and said control terminal of said synchronous rectifier is a gate.

3. A converter according to claim 1, wherein at least one of said first and second impedance circuits has an impedance which is set to a predetermined value other than zero.

4. A converter according to claim 1, wherein at least one of said first and second impedance circuits includes a resistor coupled in series with said control terminal of said synchronous rectifier.

5. The converter according to claim 4, wherein said at least one impedance circuit includes a diode having an anode and a cathode, wherein said diode is connected across said resistor and said anode is coupled to said control terminal of said synchronous rectifier.

6. A converter according to claim 1, wherein at least one of said first and second impedance circuits includes a capacitor coupled in series with said control terminal of said synchronous rectifier.

7. A synchronous rectification-type converter, comprising:
   a main transformer having a primary winding and a secondary winding, said primary winding for connection to an unrectified input voltage;
   a main switch connected in series with said primary winding of said main transformer;
   a series-coupled capacitor and clamp switch circuit connected across said primary winding, said circuit being operated in synchronism with said main switch to clamp a reset voltage on said primary winding of said main transformer; first and second series-coupled synchronous rectifiers each having a control terminal, said series coupled rectifiers being connected across said secondary winding and being biased in synchronism with said main switch;
   a first impedance circuit coupled between said secondary winding of said main transformer and said control terminal of said first synchronous rectifier; and
   a second impedance circuit coupled between said secondary winding of said main transformer and said control terminal of said second synchronous rectifier,
   wherein synchronous rectification is performed in accordance with an active clamp scheme.

8. A converter according to claim 7, wherein said synchronous rectifier comprises a metal oxide semiconductor field effect transistor, and said control terminal of said synchronous rectifier is a gate.

9. A converter according to claim 7, wherein at least one of said first and second impedance circuits has an impedance which is set to a predetermined value other than zero.

10. A converter according to claim 7, wherein at least one of said first and second impedance circuits includes a resistor coupled in series with said control terminal of said synchronous rectifier.

11. The converter according to claim 10, wherein said at least one impedance circuit includes a diode having an anode and a cathode, wherein said diode is connected across said resistor and said anode is coupled to said control terminal of said synchronous rectifier.

12. A converter according to claim 7, wherein at least one of said first and second impedance circuits includes a capacitor coupled in series with said control terminal of said synchronous rectifier.

13. A synchronous rectification-type converter, comprising:

a main transformer having a primary winding and a secondary winding, said primary winding for connection to an unrectified input voltage;

a main switch connected in series with said primary winding of said main transformer;

a series-coupled capacitor and clamp switch circuit for clamping a reset voltage on said primary winding of said main transformer;

first and second series-coupled synchronous rectifiers each having a control terminal, said series coupled rectifiers being connected across said secondary winding and being biased in synchronism with said main switch;

a first impedance circuit coupled between said secondary winding of said main transformer and said control terminal of said first synchronous rectifier; and a second impedance circuit coupled between said secondary winding of said main transformer and said control terminal of said second synchronous rectifier, wherein synchronous rectification is performed in accordance with an active clamp scheme.

14. A converter according to claim 13, wherein said synchronous rectifier comprises a metal oxide semiconductor field effect transistor, and said control terminal of said synchronous rectifier is a gate.

15. A converter according to claim 13, wherein at least one of said first and second impedance circuits has an impedance which is set to a predetermined value other than zero.

16. A converter according to claim 13, wherein at least one of said first and second impedance circuits includes a resistor coupled in series with said control terminal of said synchronous rectifier.

17. The converter according to claim 16, wherein said at least one impedance circuit includes a diode having an anode and a cathode, wherein said diode is connected across said resistor and said anode is coupled to said control terminal of said synchronous rectifier.

18. A converter according to claim 13, wherein at least one of said first and second impedance circuits includes a capacitor coupled in series with said control terminal of said synchronous rectifier.

* * * * *